(12) United States Patent
Mane et al.

(10) Patent No.: US 12,061,701 B2
(45) Date of Patent: Aug. 13, 2024

(54) ON-CHIP NVM ISP EMULATION IN FPGA

(71) Applicant: Seagate Technology LLC, Fremont, CA (US)

(72) Inventors: Hemant Mane, Pune (IN); Rajesh Maruti Bhagwat, Pune (IN); Avinash Suresh Pisal, Pune (IN); Niranjan Anant Pol, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/165,675

(22) Filed: Feb. 2, 2021

(65) Prior Publication Data
US 2022/0244851 A1  Aug. 4, 2022

(51) Int. Cl.
| | |
|---|---|
| G06F 21/57 | (2013.01) |
| G06F 3/06 | (2006.01) |
| G06F 8/65 | (2018.01) |
| G06F 9/445 | (2018.01) |
| G06F 13/10 | (2006.01) |
| G06F 13/42 | (2006.01) |

(52) U.S. Cl.
CPC .......... *G06F 21/572* (2013.01); *G06F 3/0604* (2013.01); *G06F 3/0655* (2013.01); *G06F 3/0679* (2013.01); *G06F 8/65* (2013.01); *G06F 9/44589* (2013.01); *G06F 13/105* (2013.01); *G06F 13/4282* (2013.01); *G06F 2213/00* (2013.01)

(58) Field of Classification Search
CPC .... G06F 3/0604; G06F 3/0655; G06F 3/0679; G06F 13/105; G06F 13/4282; G06F 2213/00
See application file for complete search history.

(56) References Cited

U.S. PATENT DOCUMENTS

| | | | | |
|---|---|---|---|---|
| 6,076,161 | A * | 6/2000 | Ho | G06F 9/30189 713/1 |
| 6,249,458 | B1 * | 6/2001 | Shokouhi | G11C 16/30 365/189.11 |
| 2006/0152249 | A1 | 7/2006 | Madurawe | |
| 2006/0212838 | A1 * | 9/2006 | Carson | G06F 30/34 716/117 |
| 2009/0128188 | A1 | 5/2009 | Madurawe | |
| 2014/0189622 | A1 * | 7/2014 | Titley | G06F 30/327 716/105 |
| 2019/0278586 | A1 * | 9/2019 | Olarig | G06F 8/654 |
| 2020/0125748 | A1 | 4/2020 | Lee et al. | |
| 2020/0127665 | A1 | 4/2020 | Zhang | |
| 2020/0371828 | A1 * | 11/2020 | Chiou | G06F 9/45558 |

* cited by examiner

*Primary Examiner* — Eric T Oberly
(74) *Attorney, Agent, or Firm* — HOLZER PATEL DRENNAN (57) ABSTRACT

An implementation of a device disclosed herein includes a field programmable gate array (FPGA) circuit and a non-volatile memory (NVM) configured external to the FPGA circuit and configured to communicate with an in-system programming (ISP) manager configured on the FPGA circuit, wherein the NVM is further configured to store one or more system parameters and one or more firmware images, wherein the ISP manager being configured to detect an ISP mode in response to receiving a signal from an ISP switch and executing an ISP state machine to update one or more FPGA CPU control registers with one or more of the system parameters and the one or more of the firmware images stored on the NVM.

20 Claims, 5 Drawing Sheets

ON-CHIP NVM ISP EMULATION IN FPGA

BACKGROUND

Modern electronic and computing devices are often implemented on a chip or integrated circuits (ICs) with a large number of components. Such chips may include volatile memory such as random access memory (RAM), non-volatile memory (NVM) such as read-only memory (ROM), processing units, and a number of other components. The NVM may be used to store on-chip data and code. Specifically, for such NVM, any time there is any partial or full update to any portion of code or data stored therein, a host or appropriate entity may program the on-chip NVM. In such a case, on a next power cycle, the firmware of the chip sees the updated code/data from on-chip NVM.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for providing in-system programming (ISP) for field programmable gate arrays (FPGAs). An implementation of a device disclosed herein includes a field programmable gate array (FPGA) circuit and a non-volatile memory (NVM) configured external to the FPGA circuit and configured to communicate with an in-system programming (ISP) manager configured on the FPGA circuit, wherein the NVM is further configured to store one or more system parameters and one or more firmware images, wherein the ISP manager being configured to detect an ISP mode in response to receiving a signal from an ISP switch and executing an ISP state machine to update one or more FPGA CPU control registers with one or more of the system parameters and the one or more of the firmware images stored on the NVM.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Integrated circuits (IC) or chips may include volatile memory such as random access memory (RAM), non-volatile memory (NVM) such as read-only memory (ROM), processing units, and a number of other components. The NVM may be used to store on-chip data and code. Specifically, for such NVM, any time there is any partial or full update to any portion of code or data stored therein, a host or appropriate entity may program the on-chip NVM. In such a case, on a next power cycle, the firmware of the chip sees the updated code/data from on-chip NVM.

Field programmable gate array (FPGA) is an example of ICs that are widely being used for product prototyping and deployment in systems. One of the requirements of such FPGA systems is to provide "field upgradability" for the user FW over standard interfaces like Universal Serial Bus (USB), Universal Asynchronous Receiver/Transmitter (UART), Ethernet, etc. However, many FPGA devices do not have on-chip embedded NVMs. Therefore, there exists a need to provide in-system programming (ISP) of the on-chip embedded NVM. Some FPGA providers tried to work-around by using on-chip NVM, however that also has a limitation of FW size it can support. Furthermore, such solutions also require manual intervention and time consuming activity that are not suitable for field upgradability or they are applicable only for specific set of FPGA devices that have partial programming facility.

Various implementations disclosed herein provides ISP for FPGAs. Specifically, the implementations disclosed herein allows to emulate on-chip ISP features for FPGAs using non-volatile memory (NVM) external to the FPGA circuit. The external NVM may be configured to communicate with an FPGA based ISP manager using USB, UART, Ethernet, etc. The solution(s) disclosed herein provides a secure, reliable, and persistent method for upgrading features of FPGAs. In alternative implementations disclosed herein, on-chip secure ISP feature of NVMs may be emulated using NAND/NOR Flash over inter-integrated circuit (IIC or I2C), serial-peripheral interface (SPI), Quad SPI (QSPI), open NAND flash interface (ONFI), parallel bus interface(s) using standard USB, UART, Ethernet, etc.

Figure 1:
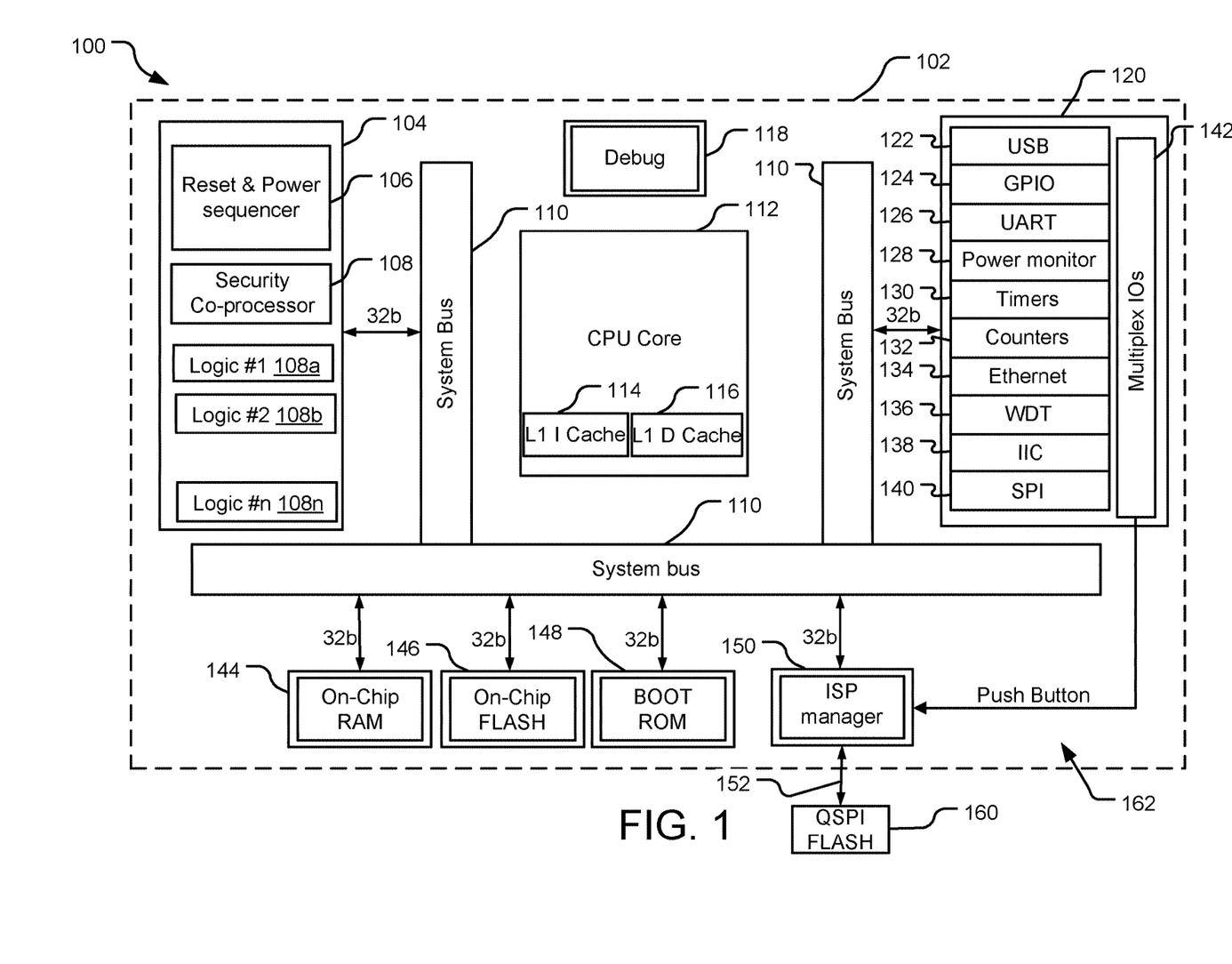
FIG. 1 illustrates a schematic diagram of an example system providing on-chip NVM in-system programming (ISP) emulation in field programmable gate arrays (FPGAs).

FIG. 1 illustrates a schematic diagram of a system 100 providing on-chip NVM in-system programming (ISP) emulation in field programmable gate arrays (FPGAs). Specifically, the system 100 includes an FPGA circuit 102 that uses an ISP manager 150 to communicate with a flash device 160. In the illustrated implementation, the flash device 160 is a QSPI flash. However, in an alternative implementation, the flash device 160 may be implemented using other type of NVM with different type of interface(s) to access it. Examples of such alternative NVMs may include NOR, NAND, ROM. The flash device 160 may communicate with the FPGA circuit 102 using an interface 152. The interface 152 may be, for example, a, IIC interface, SPI, QSPI, ONFI, USB, UART, Ethernet, IIC, Toggle, eMMC, UFS, etc.

The FPGA 102 may also include a system bus 110 that is communicatively connected to a CPU core 112, an input/output (I/O) interface 120, a set of different processing modules 104, the ISP manager 150, and various on-chip memory modules 144-148. Specifically, the on-chip memory module 144-148 may include, for example, an on-chip RAM 144, an on-chip flash 146, and an on-chip boot ROM 148. In the illustrated implementation of the FPGA 102, the system bus 110 communicates with the one or more of these modules over a 32 bit interface (the bit-width of interface may vary depending upon implementation). The sub processing modules 104 may include a reset and power sequencer circuit 106, a security co-processor 108, and different other logical modules 108b, 108c, 108n, as per system implementation. The I/O interface 120 may be configured to communicate with a host (not shown) using an IO multiplexer 142. Specifically, the I/O interface 120 may be configured to include a number of interfaces that allows the system bus 110 to communicate with the host.

In an example implementation, the interfaces may include a USB interface 122, a GPIO interface 124, a UART interface 126, an Ethernet interface 134, a WDT interface 136, an IIC interface 138, and an SPI interface 140. The I/O multiplexer 142 may multiplex one of these interfaces to the host. Additionally, the I/O interface 120 may also include a power monitor 128, various timers 130, and counters 132. The FPGA 102 may also include a debug module 118 that stores various firmware instructions that may be executed to debug the FPGA 102. The CPU core 112 may include a level 1 instruction (I) cache 114 and a level 1 data (D) cache 116 that allows fast CPU operations. The cache 114 and 116 may be implemented using RAM, SRAM, DRAM, or DDR.

In an implementation the FPGA 102 is configured to have an external NVM, such as the QSPI flash 160 to emulate in-system programming (ISP). In such an implementation, the ISP manager 150 may be configured to detect an ISP mode in response to receiving a signal from an ISP switch. In response, the ISP manager 150 may execute an ISP state machine to update one or more FPGA CPU control registers with one or more of the system parameters and the one or more of the firmware images stored on the QSPI flash 160. The detailed configuration of the ISP manager 150 is disclosed in further detail in FIG. 2. In one implementation, the SPI manager 150 may receive the signal from an ISP switch that is implemented as a manual push button 162. For example, such push button 162 may be implemented on the outside surface of the FPGA 102. The ISP manager 150 may communicate with the QSPI flash 160 using a serial programming interface (SPI). The ISP switch that senses the trigger can be implemented as a mechanical device or it can be implemented as an electronic detector which detects special signal pattern. The ISP trigger could be implemented as a special packet coming over in-band or out-of-band signaling over some kind of interface.

As disclosed in further detail below in FIG. 2, the QSPI flash 160 may also include a system parameter area and various firmware (FW) images. The ISP manager 150 may load one or more of the system parameters and the FW images to level 1 caches 114, 116, or other components of the FPGA as part of an ISP procedure execution.

Figure 2:
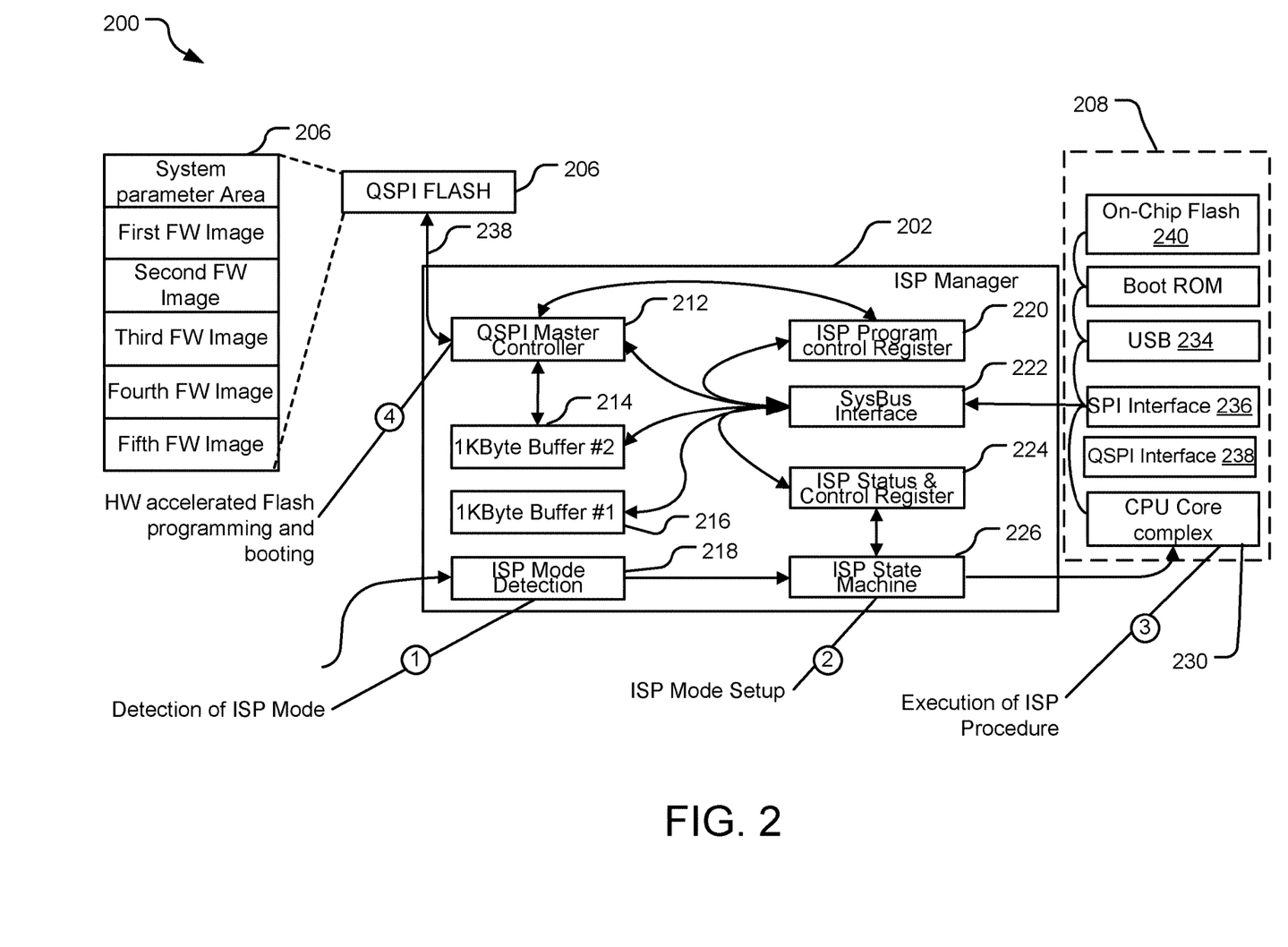
FIG. 2 illustrates an alternative schematic diagram of an example system providing on-chip NVM ISP emulation in FPGAs.

Now referring to FIG. 2, it illustrates an alternative schematic diagram of a system 200 providing on-chip NVM ISP emulation in FPGAs. Specifically, FIG. 2 illustrates a detailed view of the various components of the ISP manager 202 communicating with a QSPI flash 206 and various other components of the FPGA. The ISP manager 202 may be configured on the FPGA while the QSPI flash 206 may be configured external to the FPGA. The ISP manager 202 includes a QSPI master controller 212 that communicates with the QSPI flash 206. The QSPI master controller 212 may also communicates with Buffer 1 214 and Buffer 2 216 as using a system bus interface 222. Additionally, the ISP manager 202 includes an ISP state machine 226 to store various instructions that are executed for implementing an ISP procedure, ISP program control registers 220 to save various ISP program control values and an ISP status & control registers 224 to store various ISP procedure status values.

An ISP mode detection module 218 of the ISP manager 202 may detect initiation of ISP mode that may be triggered by, for example, a user pressing a push button. For example, a user may press such a push button on the FPGA case. In one implementation, the user may be required to keep the push button pressed for more than a predetermined amount of time, such as over 5 seconds, to initiate the ISP mode. In an alternative implementation, the trigger may be generated by from an electrical interface through either an in-band or an out-of-band signaling. Such push event may be detected by the ISP mode detection module 218 and in response the ISP mode detection module 218 sends an ISP mode event signal to the ISP state machine 226.

In response, the ISP state machine 226 is initiated. The ISP state machine 226 may be configured to manage the ISP manager 202. Upon receiving ISP mode event signal, the ISP state machine 226 clears both Buffer #1 216 and Buffer #2 214. The term clearing buffers means simply making the read or write pointers equal or clearing the contents of the buffer to known state and adjusting the pointers to proper values. Alternatively, the state machine 226 clears the contents of the buffers 214 and 216 along with the pointers managing these buffers as well. Subsequently, it sets CPU mode within the ISP status & control register 224 to ISP mode and sends a soft reset signal or an interrupt signal to the CPU core 230 of the FPGA.

Execution of the ISP procedure is initiated upon receiving the soft reset or the interrupt at the CPU core 230 by starting a boot operation. The CPU core 230 and other FPGA components 208 may communicate with each other and the ISP manager using a system bus, such as the system bus 110 disclosed in FIG. 1. As part of the boot procedure, the CPU core 230 reads the ISP status & control register 224 and determines that it has to execute the ISP procedure. Subsequently, as a part of the ISP procedure, CPU core 230 reads packets from a USB port 234 in one of the possible implementations and put it on Buffer #1 216. Subsequently, the CPU core 230 performs necessary security checks and puts data to be programmed into Buffer #2 214. As a next step, the CPU core 230 writes a QSPI Erase command into the ISP program control Register 220 and indicates QSPI master to execute command on an external QSPI Flash non-volatile memory. The CPU core 230 keeps reading the ISP status and control register 224 for operation completion bit to set, which will be set by either the ISP state machine 226 or a QSPI Master interface 238. Subsequently, the CPU sets program command and addresses into the ISP program control register 220 and indicates the QSPI master interface 236 to execute a command on an external QSPI Flash non-volatile memory. Upon successful completion of the program, the CPU core 230 starts to get the next packet from the USB interface 234.

Subsequently, as part of hardware accelerated flash programming and booting, the QSPI master controller 212 may be managed by ISP manager 202. At this stage, the QSPI flash 206 stores multiple copies of FW images, content of the ISP-Status-&-Control-Register 224 and any other contents that the user needs to store. The QSPI master controller 212 operates on commands written within ISP program control register 220 whereas the QSPI master controller 212 supports erase, program and read operations. Finally, during normal boot operation of application code based on image copy selection, boot code copies image from QSPI Flash 206 to emulated on-chip Flash 240. The QSPI flash 206 may include various system parameters stored in a system parameter storage area and a number of firmware images. Specifically, the illustrated implementation of the QSPI flash 206 includes five firmware images. The system parameters and the firmware images may be loaded to one or more of the various FPGA component 208.

Figure 3:
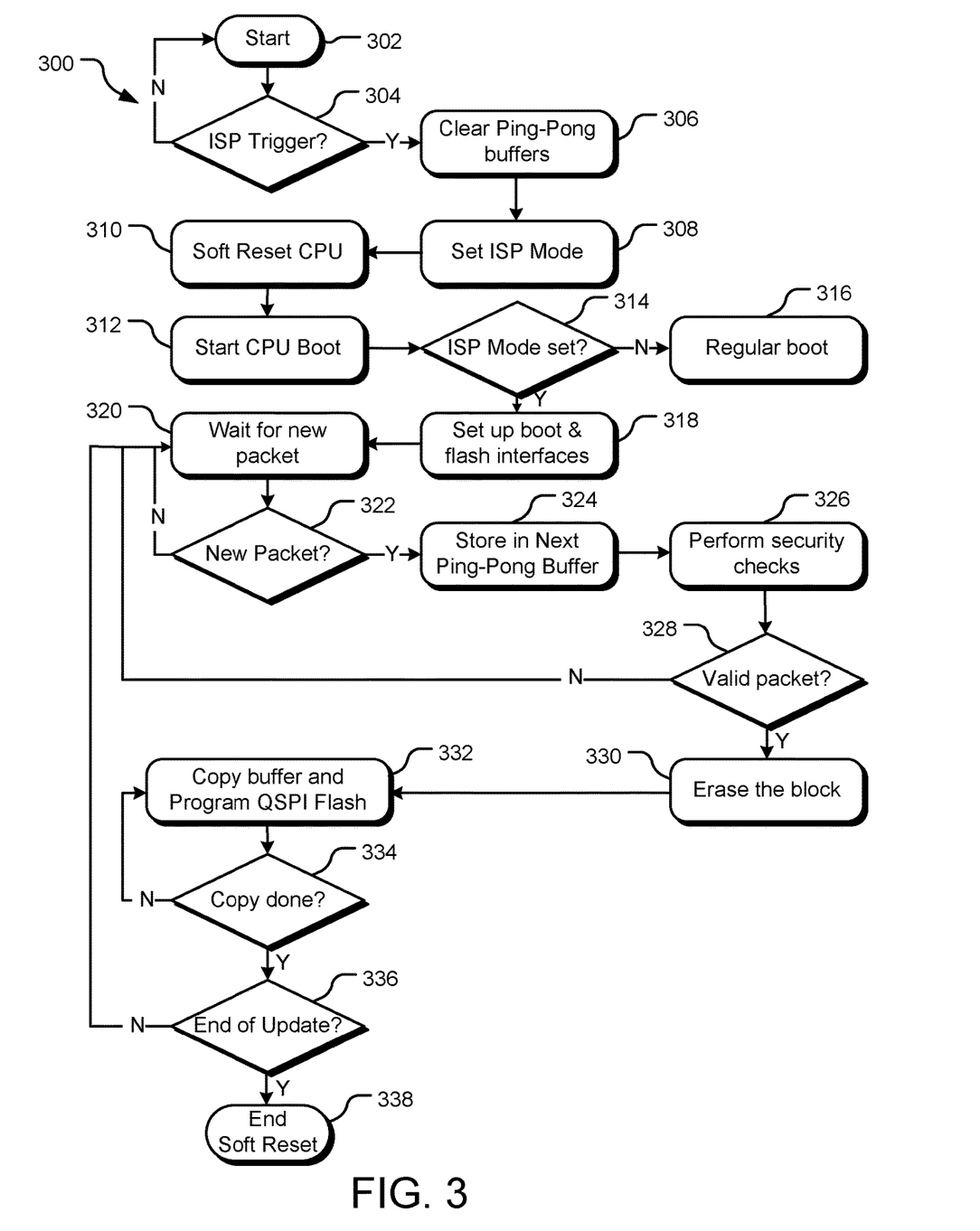
FIG. 3 illustrates example operations for providing on-chip NVM ISP emulation in FPGAs in a manner disclosed herein.

FIG. 3 illustrates example operations 300 for providing on-chip NVM ISP emulation in FPGAs in a manner disclosed herein. The operations start at 302 and an operation 304 determines if an ISP trigger is received. The ISP trigger may be generated by a user by pushing a button on the body of an FPGA and in response an ISP-mode-detection module may send an event to an ISP state machine (SM). In response to receiving the ISP trigger at the ISP SM, an operation 306 clears ping-pong buffers (In alternative implementations, user may choose to have different types of buffer implementations), such buffers 216 and 214. Subsequently, an operation 308 sets CPU mode within ISP status & control register 224 to ISP mode. An operation 310 sends a soft reset or an interrupt to the CPU core 230 of the FPGA circuit.

Upon receiving either if the soft reset or the interrupt, at operation 312 the CPU core 230 starts a boot operation. Subsequently, an operation 314 determines if the ISP mode is set, if not the CPU core 230 starts a normal boot operation at 316. If the ISP mode is set at operation 318, as part of the boot procedure, the CPU core 230 reads ISP status & control register 224 and determines that it has to execute an ISP procedure. As part of the ISP procedure, at operation 320, the CPU core 230 reads packets from the USB port 234 and puts them on Buffer #1 216. This process of reading packets at the USB port 234 and adding it to the next buffer iterates at operations 322 and 324.

Once the packets are stored in the buffer, an operation 326 performs an necessary integrity and security checks and put data to be programmed into Buffer #2 218. An operation 328 determines if the packet received from the USB port 234 is a valid packet. The integrity and security checks may be implemented using, for example, CRC, hashing, secure hashing, etc. Initially, a host may identify itself or the host may ask the system in subject to identify itself. After confirming the identity of the system, the host may decide on the size of the new FW image(s) to be downloaded and number of frames of some size, etc. Therefore, in one implementations, the system also checks the overall length of FW image, length of each frame/fragment, etc. If the packet is not valid, control transfers to 320 to wait for a new packet. If the packet is valid, an operation 330 writes a QSPI Erase command into ISP program control Register 220 and instructs the QSPI master controller 212 to execute command on the QSPI Flash memory 206. As a result, the QSPI flash 206 is now available to be rewritten.

Subsequently, at operation 332 the content of the buffers 216, 214 are written onto the QSPI flash 206. An operation 334 determines if the copying of the content from the buffers 216, 214 to the QSPI flash 206 is complete. If so, an operation 336 determines if the process of updating the QSPI flash 206 is complete. If not, the CPU core 230 starts to get next packet from USB port 234. Otherwise, the soft reset ends at operation 338.

Figure 4:
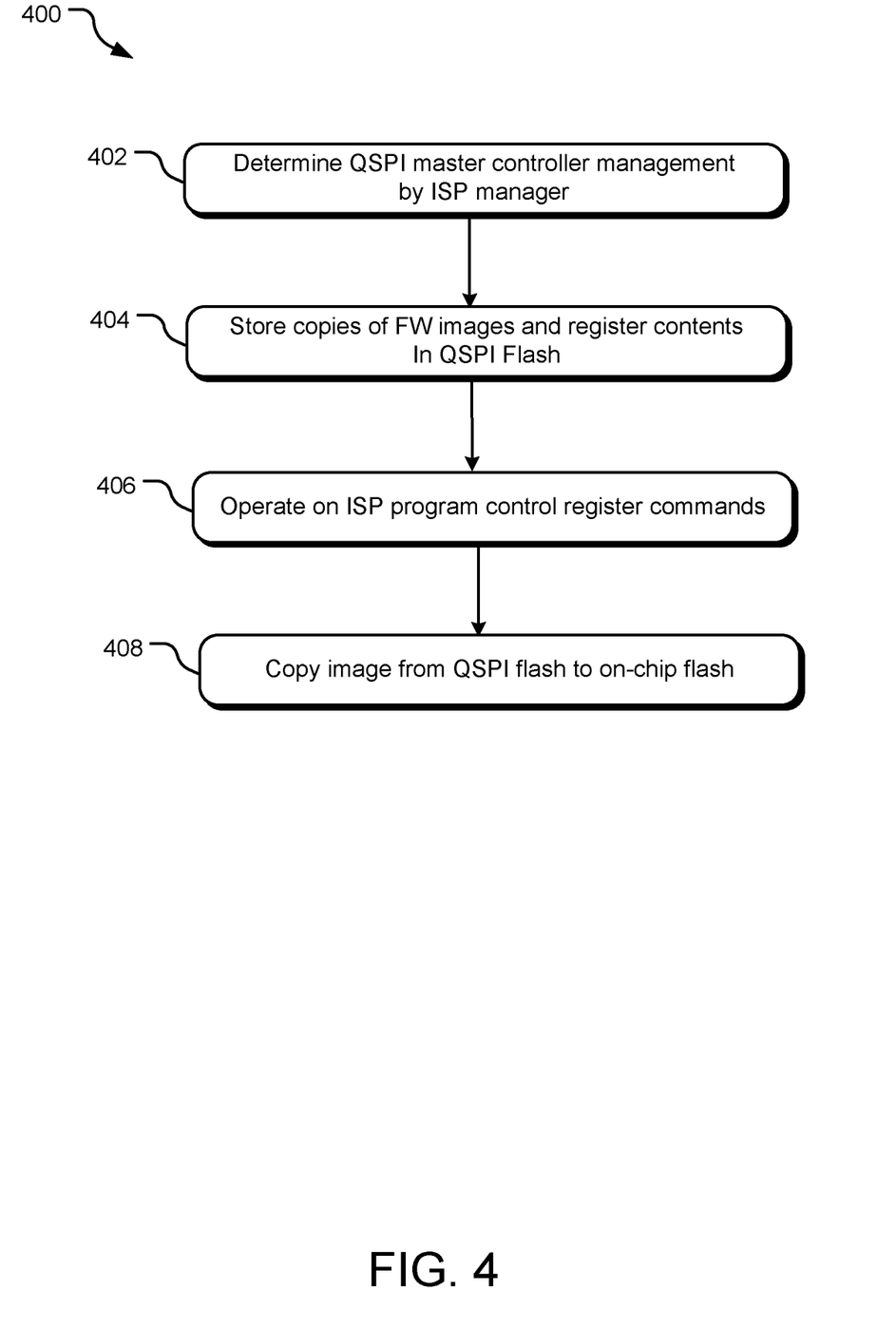
FIG. 4 illustrates alternative example operations for providing on-chip NVM ISP emulation in FPGAs in a manner disclosed herein.

FIG. 4 illustrates example operations 400 for providing on-chip NVM ISP emulation in FPGAs in a manner disclosed herein. Specifically, the operations 400 provide HW accelerated flash programming and booting. An operation 402 determines that the QSPI Master controller 212 is to be managed by an ISP manager. Subsequently, at operation 404, the QSPI flash 206 stores, multiple copies of FW images, ISP-Status-&-Control-Register 224 contents and any other contents (TBD) which user needs to store. At operation 406, the QSPI master controller 212, or another controller, operates on commands written within the ISP program control register 220. The QSPI master controller 212 supports erase, program, and read operations. Finally, at operation 408, during a normal boot operation of application code based on FW image copy selection, the boot code copies image from the QSPI Flash 206 to emulated on-chip flash 240.

Figure 5:
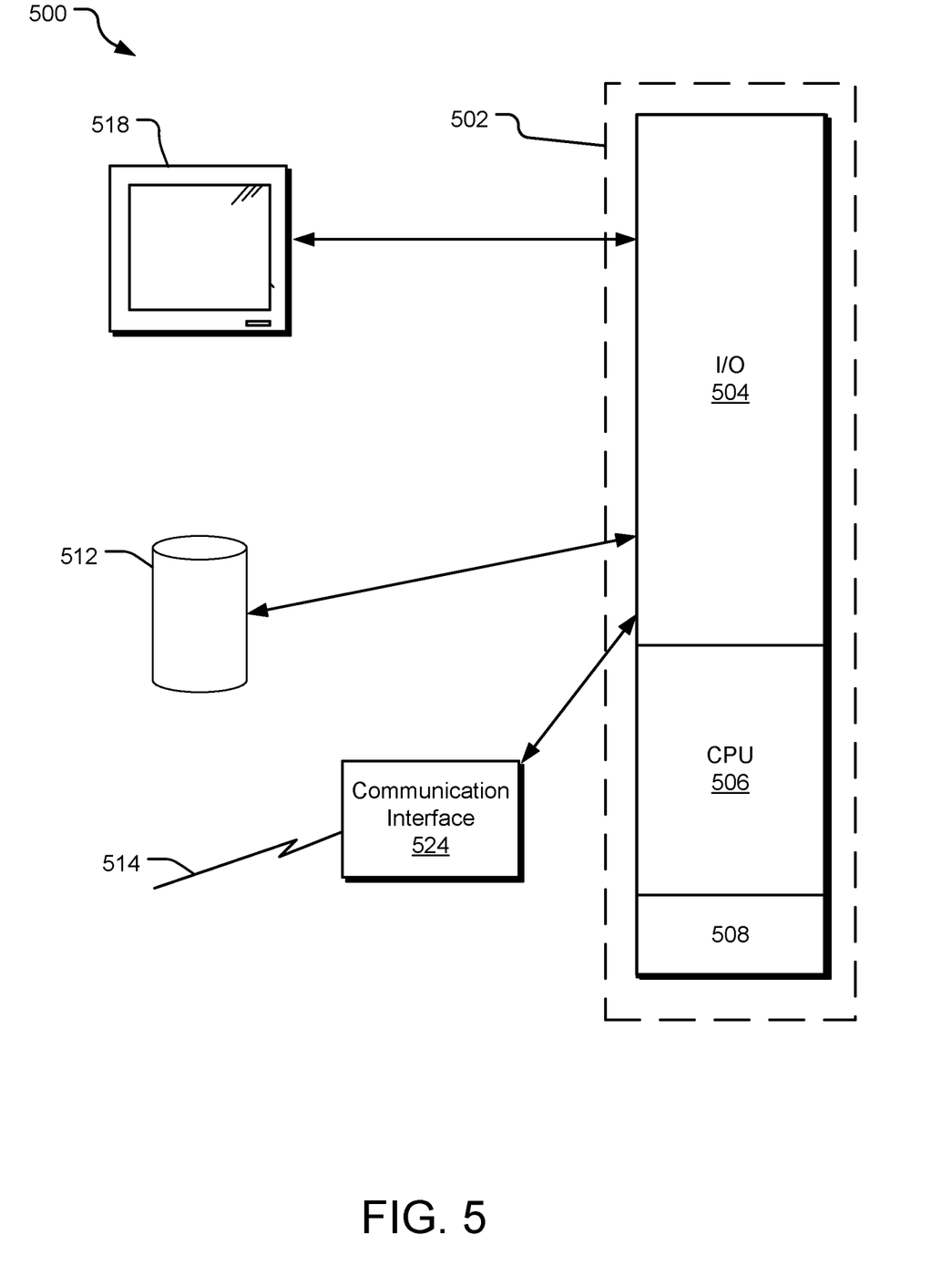
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system, comprising:
a field programmable gate array (FPGA) circuit including:
an in-system programming (ISP) manager configured to execute one or more instructions of an ISP state machine on a central processing unit (CPU) of the FPGA,
memory configured to store ISP program registers and ISP status & control registers, and
one or more buffers configured to store packets from a host;
wherein the ISP manager being configured to detect an ISP mode in response to receiving a signal from an ISP switch and in response to detecting the ISP mode, loading one or more system parameters and one or more firmware images stored on an external non-volatile memory (NVM) external to the FPGA circuit to level 1 caches on the FPGA, confirming integrity of the loaded firmware images by verifying the length of the firmware images, and in response to confirming the integrity of the loaded firmware images, executing the ISP state machine using the ISP program registers and ISP status & control registers to update one or more FPGA CPU control registers with one or more system parameters and one or more firmware images loaded on the level 1 caches of the FPGA.

2. The system of claim 1, further comprising an in-system programming (ISP) mode detector configured to detect an ISP mode in response to receiving an ISP signal from an ISP switch.

3. The system of claim 1, wherein the external NVM is one of quad serial peripheral interface (QSPI) flash and NAND/NOR flash.

4. The system of claim 1, wherein the external NVM is configured to communicate with the ISP manager using QSPI.

5. The system of claim 1 wherein the ISP switch is configured using a register-transfer level (RTL) module that detects a push button pressed for a time-period above a predetermined amount of time.

6. The system of claim 1 wherein the FPGA circuit further comprising an on-chip flash memory configured to receive firmware images from the external NVM.

7. The system of claim 1, wherein the FPGA circuit further comprising a quad SPI (QSPI) master controller configured to communicate with the external NVM using a QSPI interface.

8. The system of claim 1, wherein the ISP state machine is configured to perform one or instructions comprising:
   starting a CPU boot operation in ISP mode,
   reading packets from a host to the one or more buffers,
   erasing the external NVM,
   copying the values from the buffers and programming the external NVM, and
   reading ISP status and control registers from the ISP manager and executing the ISP procedure using the ISP status and control registers.

9. A device, comprising:
   a field programmable gate array (FPGA) circuit; and
   an external non-volatile memory (NVM) external to the FPGA circuit and configured to communicate with an in-system programming (ISP) manager configured on the FPGA circuit, wherein the external NVM is further configured to store one or more system parameters and one or more firmware images,
   wherein the ISP manager being configured to detect an ISP mode in response to receiving an ISP signal from an ISP switch and in response to detecting the ISP mode, loading one or more system parameters and one or more firmware images stored on the external NVM external to the FPGA circuit to level 1 caches on the FPGA, confirming integrity of the loaded firmware images by verifying the length of the firmware images, and in response to confirming the integrity of the loaded firmware images, executing an ISP state machine to update one or more FPGA CPU control registers with one or more system parameters and one or more firmware images loaded on the level 1 caches of the FPGA.

10. The device of claim 9, wherein the external NVM is one of quad serial peripheral interface (QSPI) flash and NAND/NOR flash.

11. The device of claim 9, wherein the external NVM is configured to communicate with the ISP manager using QSPI.

12. The device of claim 9, wherein the ISP switch is configured using a register-transfer level (RTL) module that detects a push button pressed for a time-period above a predetermined amount of time.

13. The device of claim 9, wherein the FPGA circuit further comprising an on-chip flash memory configured to receive firmware images from the external NVM.

14. The device of claim 13, wherein the ISP state machine is configured to perform one or instructions comprising:
   starting a CPU boot operation in ISP mode,
   reading packets from a host to the one or more buffers,
   erasing the external NVM,
   copying the values from the buffers and programming the external NVM, and
   reading ISP status and control registers from the ISP manager and executing the ISP procedure using the ISP status and control registers.

15. The device of claim 14, wherein the FPGA circuit further comprising a QSPI master controller configured to communicate with the external NVM using a QSPI interface.

16. A method, comprising:
   receiving an in-system programming (ISP) trigger at a field programmable gate array (FPGA) circuit;
   in response to receiving the ISP trigger, configuring the FPGA circuit to operate in an ISP mode by clearing one or more buffers of an ISP manager;
   executing an ISP procedure stored in an ISP machine, the ISP procedure comprising:
      starting a CPU boot operation in ISP mode,
      reading packets from a host to the one or more buffers,
      loading one or more system parameters and one or more firmware images stored on an external non-volatile memory (NVM) external to the FPGA circuit to level 1 caches on the FPGA,
      confirming integrity of the loaded firmware images by verifying the length of the firmware images,
      in response to confirming the integrity of the loaded firmware images, erasing the external NVM,
      copying the values from the buffers and programming the external NVM,
      reading ISP status and control registers from the ISP manager and executing the ISP procedure using the ISP status and control registers;
   performing hardware accelerated NVM programming; and
   copying the one or more firmware images stored on the external NVM to on-chip flash on the FPGA.

17. The method of claim 16, wherein receiving the ISP trigger further comprising receiving the ISP trigger from an ISP switch configured using a register-transfer level (RTL) module that detects a push button pressed for a time-period above a predetermined amount of time.

18. The method of claim 16, wherein the FPGA circuit further comprising a quad SPI (QSPI) master controller configured to communicate with the external NVM using a QSPI interface.

19. The method of claim 16, wherein the FPGA circuit further comprising an on-chip flash memory configured to receive firmware images from the external NVM.

20. The method of claim 16, wherein the external NVM is one of QSPI flash and NAND/NOR flash.

* * * * *